Patented May 19, 1953

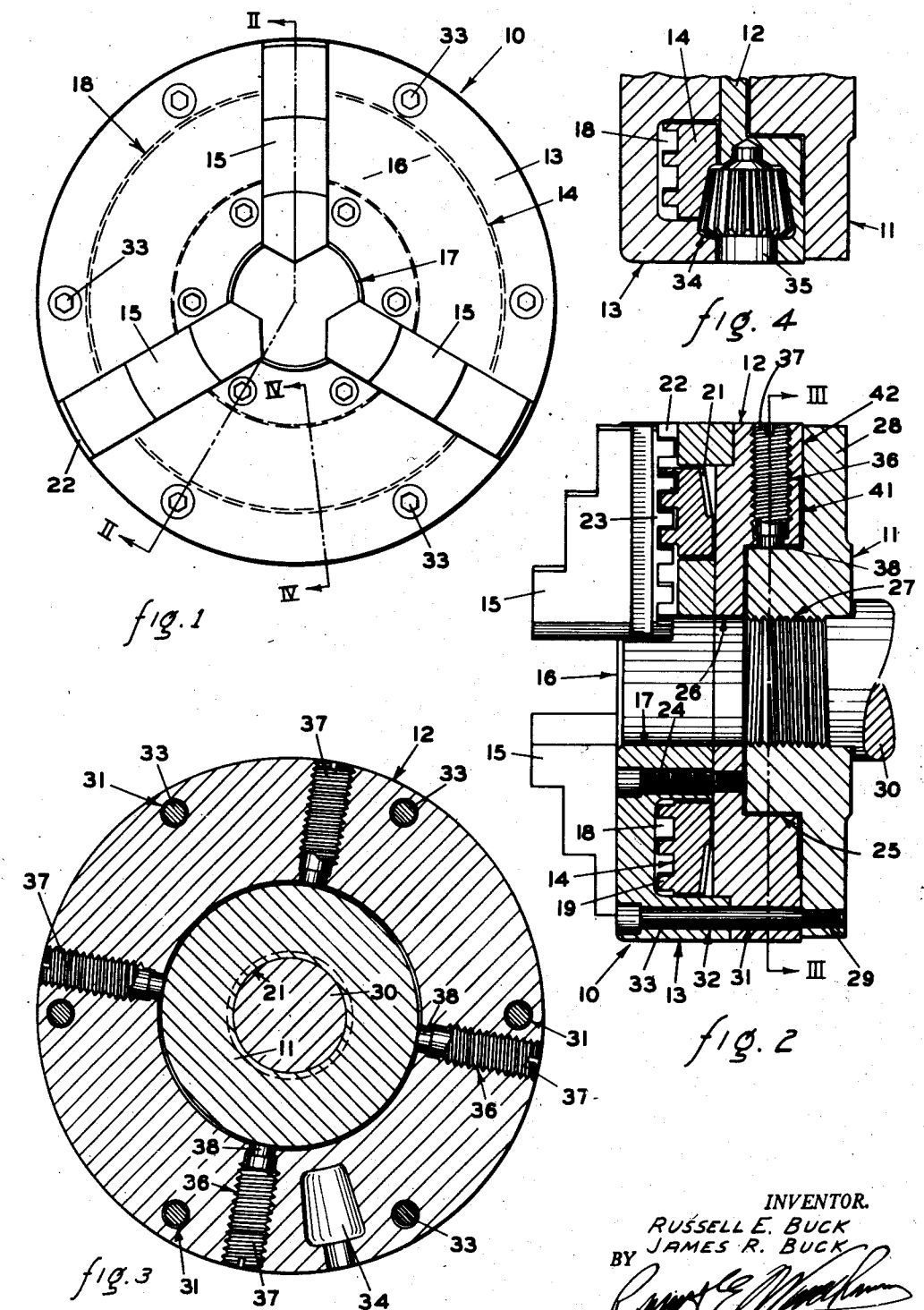

2,639,157

UNITED STATES PATENT OFFICE 2,639,157

ADJUSTABLE CHUCK

Russell E. Buck, Kalamazoo, and James R. Buck, Scotts, Mich.

Application April 9, 1951, Serial No. 220,014

2 Claims. (Cl. 279—6)

This application, which is a continuation-in-part of our application Serial No. 154,982, filed April 10, 1950, now abandoned and entitled "Adjustable Chuck," discloses an invention relating in general, to a universal chuck and more particularly to a type thereof provided with a mechanism, independent of the means operating the chuck jaws, whereby said chuck may be accurately centered with respect to the rotational axis of a spindle supporting the chuck.

Operators of machine shops, having occasional jobs calling for lathe work on a quantity of identical articles requiring accuracy to within .005 of an inch, have long recognized the need for a lathe chuck having the jaw capacity and simplicity in operation of a universal chuck, while having the centering accuracy of a chuck with individually adjustable jaws.

A standard universal chuck, although suitable for production use from the standpoint of speed, can not be depended upon for accuracy in centering below .003 of an inch. The type of chuck having independently adjustable jaws must be re-centered each time a new piece of work is placed therein and, therefore, is not satisfactory for production use. The jaw capacity of a single collet chuck is so limited by its structure that it can not be used interchangeably for production work and piece work. Furthermore, a considerable number of collet chucks having progressively larger or smaller jaw capacities are required to equal the jaw range of a single universal chuck.

Numerous attempts have been made to fill the above mentioned need by providing a standard universal chuck with an independently adjustable adapter mounted upon the lathe spindle, whereby the universal chuck could be accurately centered for any particular given jaw opening. However, such attempts have not been satisfactory, as evidenced by their lack of commercial acceptance, for a variety of reasons. Paramount among such reasons is the fact that when the adapter is secured to the chuck so that it will not move with respect thereto during use of the chuck, it is difficult to obtain accurate, permanent radial adjustment between the chuck and the adapter. In all chucks which we have observed, the adapters are secured to the chuck by bolts of relatively short axial length which extend through oversized openings in the adapter. Thus, when a radial adjustment is made between the adapter and chucks, the adapter must move with respect to both the chuck and the heads of said bolts, since said short bolts strenuously resist flexion. Such movement is opposed by large frictional resistance which imposes excessive strains upon the combined chuck and adapter, unless said bolts are loosened before the adjustment is made and such loosening operation defeats the purpose of the adjustment mechanism. If the bolts are not loosened, the adjustment is jerky, difficult to control and often terminates under such a strain that subsequent operation of the chuck will disturb the adjustment. In other words, permanent and accurate centering of a universal chuck for a given jaw setting by adapters presently in use is extremely difficult at best.

Accordingly, a primary object of this invention is the provision of a lathe chuck which is adaptable either to small production jobs or to piece work, particularly where accuracy of centering is required.

A further object of this invention is the provision of a lathe chuck, as aforesaid, having the jaw range and simplicity in adjustment of a universal chuck, while also having the centering accuracy of a chuck with individually adjustable jaws.

A further object of this invention is the provision of a universal chuck, as aforesaid, provided with an adjustment mechanism, independent of the universal feature of the chuck, whereby the jaws of the chuck may be accurately and permanently centered for a given jaw opening with respect to a spindle supporting the chuck.

Other objects of this invention will become apparent to persons familiar with this type of equipment upon reading the following specification and referring to the accompanying drawings in which:

Figure 1 is a front elevation view of our chuck showing the chuck jaws supported thereon.

Figure 2 is a sectional view of said chuck substantially as taken along the line II—II of Figure 1.

Figure 3 is a sectional view substantially as taken along the line III—III of Figure 2.

Figure 4 is a sectional view substantially as taken along the line IV—IV of Figure 1.

General description

In meeting those objects heretofore mentioned, as well as others incidental thereto and associated therewith, we have provided a universal chuck having a cylindrical recess in the axial end thereof remote from the chuck jaws. A mounting adapter, part of which extends loosely into said recess, is movably secured to said chuck adjacent to said axial end thereof by a plurality of bolts extending through oversized, aligned openings through said chuck parallel with the axis thereof. A plurality of screws are radially disposed within said chuck for engagement at their inner ends with that part of said adapter extending into said recess.

*Detailed construction*

As shown in Figures 1 and 2, the adjustable center chuck 10 is comprised of a mounting adapter 11, a base member 12, a cap member 13, a ring member 14 and a plurality of chuck jaws 15.

For the purpose of convenience in description, the terms "front" or "forwardly" and "rear" or "rearwardly," as used in the following specification, will be understood to mean leftwardly and rightwardly of the chuck 10 when positioned as appearing in Figure 2. The terms "inner" or "inwardly" and "outer" or "outwardly" shall be understood to have reference to the geometric center of the chuck 10 or parts thereof.

The cap member 13 (Figures 1 and 2), which may be substantially similar to an equivalent part in a conventional universal chuck, is cylindrical in shape, has a planar front face 16 and a cylindrical, co-axial work opening 17 extending therethrough. The rearward end of the cap member 13 is provided with an annular recess 18, co-axial therewith, in which the ring member 14 (Figures 1 and 2) is rotatably disposed. The front face of the ring member 14 is provided with a conventional spiral gear having teeth 19, and the rear face of the ring member 14 is provided with a conventional, integral beveled gear having teeth 21.

The front face 16 of the cap member 13 is provided with a plurality, here three, of equally spaced, radially disposed jaw grooves 22, of any convenient, conventional type, into which appropriate chuck jaws 15 are radially, slidably disposed, in a conventional manner. The rear end of each jaw 15 is provided with jaw teeth 23 for appropriate intermeshing with the spiral gear teeth 19 on the ring member 14.

The base member 12 (Figures 2, 3 and 4), which is cylindrical in shape and preferably equal in diameter to the cap member 13, is mounted upon the rearward end of the cap member 13 by means such as bolts, one of which is shown at 24 in Figure 2. The bolts 24 are preferably slidably received through openings in the cap member 13 and threadedly engaged with a threaded bore in the base member 12 in order to reduce the thickness of the base member 12 and hence reduce the overhang of the chuck 10 on the spindle 30.

The base member 12 completes the closure of the annular recess 18 in the cap member 13, which houses the ring member 14. The base member 12 is provided with a co-axial cylindrical recess 25 in the rearward end thereof and a co-axial, cylindrical opening 26 advantageously identical in diameter to the work opening 17 in the cap member 13 and substantially smaller in diameter than the cylindrical recess 25. The rearward face of the base member 12 is provided with a slight, circular recess 41 surrounding, and adjacent to, the cylindrical recess 25, whereby an annular boss 42 is provided adjacent to the periphery of the base member.

The cylindrical mounting adapter 11 (Figures 2 and 3) is slightly, as $\frac{1}{32}$ of an inch, smaller in diameter than the inside diameter of the recess 25 in the base member 12 for loose reception therewithin. The adapter 11 is provided with a partially threaded, co-axial, spindle opening 27, substantially equal in diameter to the cylindrical opening 26 in the base member 12, for engaging a lathe spindle 30. The mounting adapter 11 is also provided with a co-axial, integral, circular flange 28 adjacent to the rearward end thereof, which is substantially equal in diameter to the diameter of the base member 12.

The rearward face of the boss 42 on the base member 12 is engageable by the radially extending flange 28 of the adapter 11, at which time the portion of the adapter within the recess 25 is spaced from the inner, axial wall thereof. Hence, any axial pressure between the base member 12 and adapter 11 is borne by the rearward surface of the boss 42 and the corresponding surface on the flange 28.

The flange 28 (Figure 2) is provided with a plurality, here six, of equally spaced, threaded openings 29 adjacent to its periphery, whose axes are substantially parallel with the axis of the adapter 11 and radially equidistant therefrom. A similar number of smooth bore bolt openings 32 and 31, which are preferably equal in diameter, are provided in the cap member 13 and base member 12, respectively, and are alignable with said threaded openings 29 in the flange 28 when the adapter 11 is disposed within the cylindrical recess 25. A bolt 33, having a shank diameter somewhat less than the diameter of the bolt openings 31 and 32, is slidably receivable into each pair of said bolt openings for threaded engagement with a threaded opening 29 (Figure 2) and the heads thereof are supported substantially adjacent to the front surface of the cap member 13, in order to secure a maximum length for the bolts, for reasons appearing hereinafter, in any given size of chuck.

Said bolts 33 are sufficiently long with respect to their diameter that they will flex readily laterally to permit radial motion of the adapter 11 with respect to the base member 12 as the hereinafter mentioned adjustment screws 37 are moved, and yet the diameter of said bolts 33 must be great enough to enable the bolts 33 to hold the chuck and adapter part together firmly. As shown in the drawing, the bolt head bears against a radial surface of said chuck which in this embodiment is countersunk below the front face 16 of the chuck a distance sufficient to prevent the bolt head from extending out beyond said front face 16 and said bolt is free from engagement with the walls of the bolt opening 32 throughout the remainder of the distance which it extends through said bolt openings 31 and 32.

In one preferred embodiment of our invention involving a cap member 13 having an outside diameter of approximately 6 inches, the shank of the bolt 33 is ¼ inch in diameter and the bolt openings 31 and 32 are $\frac{5}{32}$ of an inch in diameter. Thus, the bolts 33 hold the adapter 11 securely but slidably against the rearward face of the boss 42 on the base member 12, and the oversized openings 31 and 32 permit the bolts 33 to flex radially within the bolt openings 31 and 32 when the adapter 11 is moved radially with respect to the base member 12, such movement being limited both by the looseness of the adapter 11 within the cylindrical recess 25 and by the diameter of the bolt openings 31 and 32.

A suitable pinion chamber 34 is provided partially in the base member 12 and partially in the cap member 13 for reception of the beveled gear pinion 35 operable by conventional means, such as a key, at the periphery of the chuck 10 (Figure 4). The pinion 35 is preferably disposed so that the teeth thereof are engageable with the beveled gear teeth 21 on the ring member 14 in a conventional manner.

The base member 12 is provided with a plurality, here four, of radially disposed, equally spaced, threaded adjustment screw openings 36 whose axes preferably lie within a single plane, which plane intersects the mounting adapter 11 (Figures 2 and 3). An adjustment screw 37 is threadedly disposed within each adjustment screw opening 36 and a bearing disk 38 is positioned within each adjustment screw opening 36 between the adjustment screw 37, therein, and the adjacent surface of the adapter 11, disposed within the cylindrical recess 25. The bearing disk 38 prevents scoring of the adapter 11 by the screws 37 during adjustment thereof for positioning the adapter 11 within the cylindrical recess 25. It is apparent from the drawing that the entire chuck is so proportioned that the plane defined by the adjustment screws 37 is positioned a materially lesser distance from the rear face of the annular boss 42 than it is from the plane in which the heads of said bolts 33 engage the chuck body.

It has been found, as in the case of independently adjustable chuck jaws, that four adjustment screws 37 disposed at 90° intervals about the base member 12 produce the most effective adjustment of the base member 12 with respect to the mounting adapter 11.

Operation

As shown in Figure 2, the base member 12 and cap member 13 are rigidly secured to each other by the bolts 24. The chuck jaws 15, which are supported upon the face 16 of the cap member 13, are movable toward and away from the axis of the chuck 10 in a conventional manner by the spiral teeth 19 on the ring member 14, when said ring member is rotated by the beveled pinion 35. Up to this point the chuck 10 resembles a conventional universal chuck which can not normally be depended upon for accuracy of centering below .003 of an inch.

However, our chuck 10 is not directly supported upon the spindle 30. Instead, the threaded spindle opening 27 in the mounting adapter 11 is engaged by the spindle 30 and said adapter is then slidably inserted into the cylindrical recess 25 in the base member 12 of said chuck. The peripheral face of the adapter 11 within the recess 25 is engaged by, and supported upon, the bearing disks 38 which are urged against said adapter face by the adjustment screws 37. The axial end of the adapter 11 disposed within the recess 25 in the base member 12 is spaced axially from said base member 12 to avoid frictional contact therewith.

The base member 12, hence the entire chuck 10, can be radially adjusted with respect to the adapter 11, hence the axis of the spindle 30, by means of the screws 37 without the necessity of loosening the bolts 33. When such adjustment is effected, the flange 28 of the adapter 11 will then slide only on the rearward surface of the boss 42 on the base member 12, and the bolts 33 will flex within the bolt openings 31 and 32 sufficiently to permit such movement without movement of the bolt heads with respect to the cap 13. Such adjustment movement between the adapter 11 and the base member 12 is assured with a minimum of applied force and resultant strain, by reason of the fact that the adjustment screws 37 define a plane between the annular boss 42 and the heads of the bolts 33 but closely adjacent to the annular boss 42. This arrangement has been found to eliminate the snubbing or locking action between the engaging surfaces of the adapter 11 and the base member 12 found in other chucks of this general type but having different adjustment devices. Further, because the considerable distance between the flange 28 of the adapter 11, with which the bolts 33 are threadedly engaged, and the heads of the bolts 33, the shanks of the bolts 33 can be flexed during the small adjustments, such as less than about .015 of an inch in any radial direction, which are normally required in centering the chuck, without imposing any objectionable strain upon either the chuck 10, the bolts 33 or the adapter 11.

Such radial adjustment permits extremely accurate centering of the chuck jaws 15 with respect to the axis of the spindle 30 for a given jaw opening, regardless of the size of said opening. Obviously, this adjustment may change for various sizes of jaw openings. However, when the jaws 15 are once properly centered with respect to the axis of the spindle 30 for a given jaw opening, said jaws may then be repeatedly opened and closed by the pinion 35 and the ring member 14 without disturbing the accuracy of centering at said given jaw opening. This feature greatly facilitates the use of the chuck on production operations where a quantity of pieces having substantially identical outside or inside diameters must be quickly and accurately centered by the chuck. The chuck 10, once accurately centered for the proper jaw opening, will remain accurately centered for this opening throughout the operation, regardless of the frequency of opening and closing the jaws by the pinion 35 and ring member 14. The accuracy of centering under these conditions can be held to less than .0005 of an inch and is well within the tolerance of the lathe bearings.

Further, for a given adjustment when repeated opening and closing is not required, this chuck may be made dead true within the tolerance of the lathe bearings. Therefore, whether for single or multiple items of work, the accuracy with which the work is held is limited only by the accuracy of the lathe bearings.

The universal feature of the chuck 10 permits a wide range of variation in jaw openings and, having settled upon one particular jaw opening for a production operation, the mounting adapter 11 and adjustment screws 37 permit accurate and permanent centering of the jaws 15 with respect to the axis of the spindle 30 for that particular jaw opening.

Although the above mentioned drawings and description apply to one particular, preferred embodiment of the invention, it is not our intention, implied or otherwise, to eliminate other variations or modifications which do not depart from the scope of the invention unless specifically stated to the contrary in the hereinafter appended claims.

We claim:

1. In a mechanism for accurately centering the jaws of an universal chuck for a given jaw opening, the combination comprising: means defining a plurality of circumferentially spaced bolt openings through said chuck, said openings being parallel with and equi-distant from the axis of said chuck; means defining a co-axial cylindrical recess in the end of said chuck remote from said jaws; an annular boss on said last-named end of said chuck radially outwardly of said recess; a cylindrical adapter positioned loosely within said recess and spaced axially from the end wall of said recess, said adapter having an annular, radially extending flange engageable with the axial face of said boss, and said flange having threaded bores alignable with said bolt openings; headed bolts of diameter substantially less than the diameter of said bolt openings positioned respectively in said bolt openings with the heads of said bolts each engaging a radially disposed surface adjacent the end of said chuck at which said jaws are located, and the threaded ends of said bolts engaged within said threaded bores for holding said adapter flange tightly against said boss; and screw means mounted upon said chuck and engageable with said adapter in a plane intermediate the axial face of said boss and the heads of said bolts for radial adjustment of said adapter within said recess; the axial distance from the surfaces engaged by the heads of said bolts to the axial surface of said annular boss being materially greater than the axial distance from the axes of said screw means to the axial surface of said boss.

2. In a mechanism for accurately centering the jaws of an universal chuck for a given jaw opening, the combination comprising: means defining a plurality of circumferentially spaced bolt openings through said chuck, said openings being parallel with and substantially equi-distant from the axis of said chuck; means defining a co-axial cylindrical recess in the end of said chuck remote from said jaws; an annular surface on said last-named end of said chuck radially outwardly of said recess; a cylindrical adapter positioned loosely within said recess; said adapter having an annular, radially extending, flange engageable with said annular surface, and said flange having threaded bores alignable with said bolt openings; headed bolts of diameter substantially less than the diameter of said bolt openings positioned respectively in said bolt openings with the heads of said bolts each engaging a radially disposed surface adjacent the end of said chuck at which said jaws are located, and the threaded ends of said bolts engaged within said threaded bores for holding said adapter flange tightly against said annular surface; and screw means mounted upon said chuck and engageable with said adapter in a plane intermediate said annular surface and the heads of said bolts for radial adjustment of said adapter within said recess; the axial distance from the surfaces engaged by the heads of said bolts to said annular surface being materially greater than the axial distance from the axes of said screw means to said annular surface.

RUSSELL E. BUCK.
JAMES R. BUCK.

References Cited in the file of this patent

UNITED STATES PATENTS

| Number | Name | Date |
|---|---|---|
| 2,524,468 | Ouimette | Oct. 3, 1950 |

FOREIGN PATENTS

| Number | Country | Date |
|---|---|---|
| 447,590 | France | Oct. 31, 1912 |